Jan. 27, 1942. G. B. DU BOIS 2,271,255
BICYCLE
Filed Aug. 19, 1940
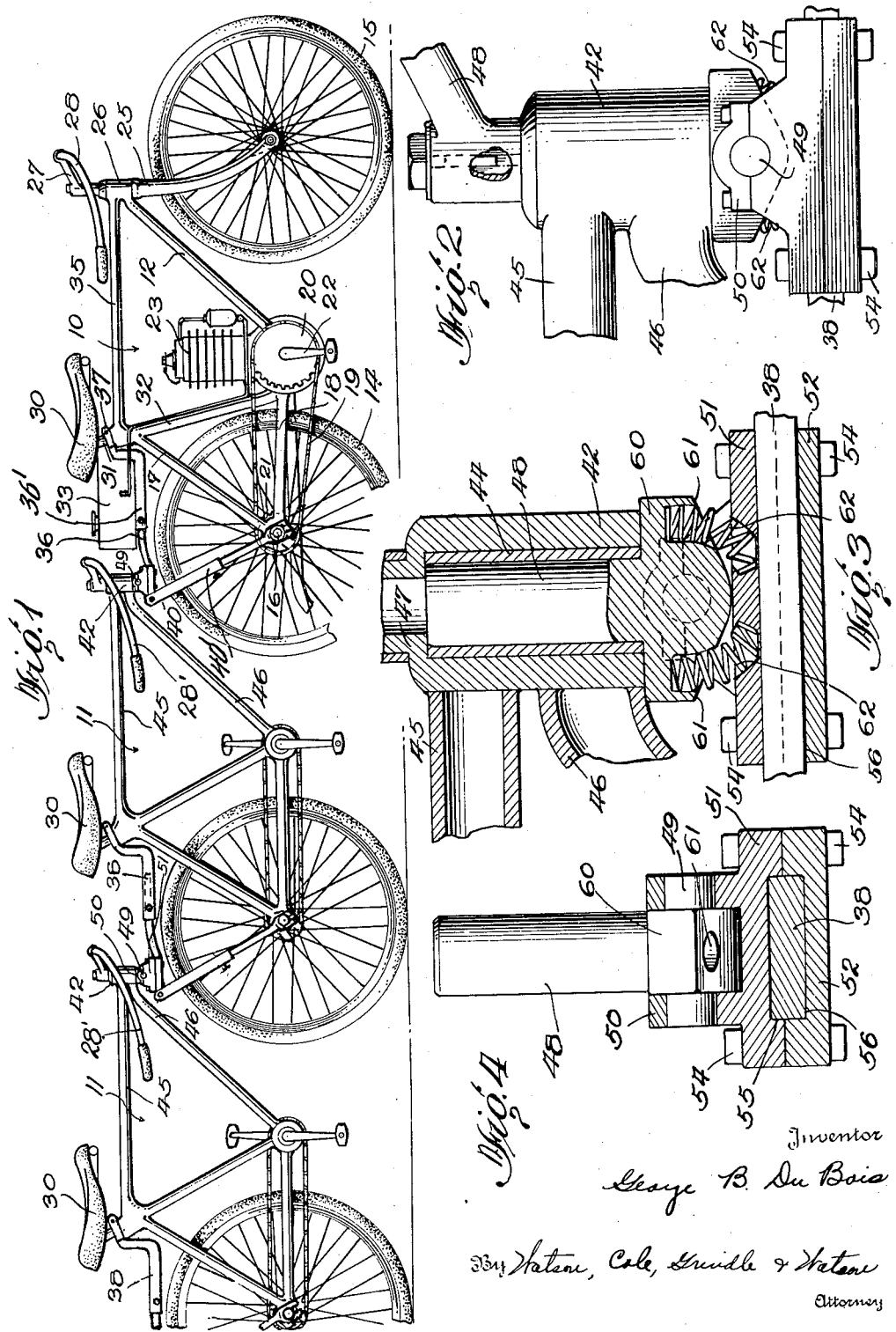
Inventor
George B. Du Bois
By Watson, Cole, Grindle & Watson
Attorney Patented Jan. 27, 1942

2,271,255

UNITED STATES PATENT OFFICE 2,271,255

BICYCLE

George B. Du Bois, Chevy Chase, Md.

Application August 19, 1940, Serial No. 353,282

7 Claims. (Cl. 280—7.16)

This invention relates to tandem or multiple bicycles, more aptly and hereinafter termed multi-cycles, of the type comprising a complete wheeled lead bicycle and one or more wheeled following sections jointed to the same and to each other in a manner to permit relative movement for steering and relative undulatory movement to compensate for road irregularities.

It is the general object of the present invention to provide a novel and improved multi-cycle.

More particularly it is an object of the invention to provide a multi-cycle including a complete lead bicycle for pedal or motor operation and including a steerable wheel and at least a driving wheel, together with one or more following bicycle sections each including but a single wheel which may be provided with propulsion means if desired.

A further object of the invention consists in the provision of novel coupling means for connecting together the lead and a following bicycle sections or for articulating two following sections in tandem, which coupling means includes a part providing for relative pivotal motion of two sections about a substantially vertical axis and for pivotal motion between two sections about a transverse axis while serving to maintain the two sections against relative rotary displacement about a longitudinal axis.

Another important object of the invention consists in the provision of attachments permitting the use of conventional bicycles, motorcycles and parts of the same for the assembly of any desired size of multi-cycle.

Other and further features and objects of the invention will be more apparent to those skilled in the art upon consideration of the accompanying drawing and the following specification wherein is disclosed a single exemplary embodiment of the invention, with the understanding that such changes and modifications may be made therein as fall within the scope of the appended claims without departing from the spirit of the said invention.

In said drawing:

Figure 1 is a side elevation of the lead bicycle and a plurality of following sections coupled thereto in accordance with the present invention;

Figure 2 is an enlarged side elevation of the coupling means;

Figure 3 is a longitudinal vertical section through the coupling means of Figure 2; and Figure 4 is a transverse section through the transverse axis of the coupling portion, attached to the rear of the frame of any section of the multi-cycle, with the pivot parts shown in elevation.

Numerous occasions arise when it is desirable for a group of persons to travel together by bicycle, but if each is equipped with an individual machine he must at all times provide the necessary power for locomotion, must be constantly alert to properly balance and steer the vehicle, and cannot ride too closely to others in the group for fear of collisions. This does not make for convenience or expediency, requires the group to occupy considerable space both transversely and longitudinally of the road and interferes with the pleasure of most of the riders. If the vehicles are used for military purposes, the cost of equipping each soldier with a complete single machine is very high and the traffic congestion resulting from such use as described above is highly undesirable.

In accordance with the present invention it is contemplated that a multi-cycle will be provided comprising a single, complete, steerable lead bicycle for manual pedaling, or power drive as desired, together with one or more following sections appropriately pivoted thereto and each including only a single wheel which may or may not be driven by pedal or otherwise as desired. With this arrangement a group of riders may travel together and occupy a minimum of space both transversely and longitudinally of the highway. There can be no stragglers and if for any reason one rider is unable or does not desire to pedal his vehicle he will be carried along by the others. As far as balance and steering are concerned, the first rider of the bicycle is the only one who is responsible for guiding in group riding. A hired professional may occupy the lead bicycle and the following machines may be occupied by individuals of a congenial group, conversation being more convenient when the responsibilty of handling the vehicle in traffic or difficult situations is concentrated in the leader.

In order that operation of the multi-cycle as set forth above may be carried out properly, it is desirable that each section of the multi-vehicle be so connected to the one ahead and behind it, that relative movement about a substantially vertical pivot is permitted so that a curved path may be followed when necessary, and further that relative up-and-down movement of the separate sections can be effected in order that they may each pass over inequalities in the road and have their wheels remain in contact for support and traction purposes. In order that no one section may topple over independently of the others, means must be provided to prevent relative rotary motion of the sections about a longitudinal axis.

The necessary means for carrying out all of the above features are illustrated in the accompanying drawing wherein is disclosed at 10 a lead cycle together with a plurality of identical following sections 11. The lead cycle is any conventional bicycle or motorcycle of standard make, and as shown may be provided with the usual diamond frame 12 of tubular construction supported from the rear or traction wheel 14 and the front or steerable wheel 15, the former of which is pivoted on a transverse axle 16 mounted between the rear forks 17 braced by the horizontal fork section 18 to take care of the pull of the drive chain 19 leading from the main sprocket 20 to the rear wheel sprocket 21. The main sprocket may be driven from the cranked pedals 22 or from a suitable power unit as conventionally illustrated at 23 in the manner of the usual motorcycle.

The steerable wheel 15 has its transverse axle mounted between the lower ends of the curved forks 25, the upper ends of which converge into a single pivot stud journalled in the hollow head 26 of the frame and have connected at its upper end the unit 27 to which the steering handle bars 28 are attached in the conventional manner. A seat 30 is adjustably mounted on the seat post 31 slidable in the frame member 32 and the gasoline tank 33 may be mounted as shown and later described or in a more conventional manner beneath the horizontal frame member 35.

In addition to the conventional parts just described, the lead cycle is equipped with an attachment which includes a rearward extension having a portion 36 substantially horizontal and attached by means of a universal clamp 37 to one of the frame members or the seat post 31 and extending rearwardly therefrom. This part which is preferably a luggage platform or gas tank support, as shown, extends rearwardly somewhat beyond the vertical through the rear axle and is sufficiently high to provide clearance for the tire. Its rearmost portion is strongly constructed and may be narrowed as shown at 38 in Figure 4. The rearward portion of platform 36 is connected or formed integral with a set of nearly vertical auxiliary fork members 40 which support it from the portion of the vehicle frame forming the integral junction of the rear forks 17 and the horizontal forks 18. The part 40 which need not be a pair of forks, but only a single side member if found sufficient, has its lower end forked as shown to be clamped in position by the rear axle nuts or is otherwise fitted with suitable clamping means for attachment to the vehicle frame near the axle.

Each of the following cycle sections, all of which are identical, may be constructed in most respects exactly like the lead cycle except that the front wheel and the steering forks are entirely absent. They may each be composed of parts of a standard bicycle, with the addition of the rear attachment such as just described in connection with the lead vehicle. Each includes a frame member having all of the elements described in connection with the lead cycle, although, as shown, only means for manual pedaling are provided. The head 42 of each following section frame is hollow in the form of a sleeve as shown in Figure 3 and preferably includes a bearing liner 44 appropriately secured therein. As shown this sleeve connects the horizontal frame member 45 with the forward inclined frame member 46 and has a reduced upper extension 47 to which the handle bar bracket 48 may be attached as shown in Figure 2 or by a universal clamp adapted to secure any standard set of handlebars to any conventional bicycle head. The handlebars 28' are fixed and are merely for the convenience of the rider and exert no control over the path of the cycle section.

Preferably the axis of the head sleeve 42 is substantially vertical, as is conventional, when the vehicle is in position for use, and is adapted to be slidably received for pivotal movement on the cylindrical stud 48 carried by the rear extension portion 38 of the frame of the preceding section or bicycle. This stud is constructed to have a close journal fit within the head sleeve liner 44 and is provided with integral horizontal trunnions 49 journalled in suitable spaced bearings 50 mounted on the part 51 formed integral with the frame attachment part 38 or as a part of a clamping unit, the lower section 52 of which is adapted for attachment thereto by four through-bolts 54. The clamp has both its upper and lower portions recessed as at 55 and 56 to fit over the rear and horizontal section 38 of the frame extension already described.

The enlarged base 60 at the junction of the stud 48 and the trunnions 49 may have a fore and aft configuration as shown in Figures 2 and 3 providing inclined lower faces 61 for cooperation with the top face of clamp member 51 for limiting the relative movement between two cycle sections in the plane of the frame of each to, for instance ensure against contact of the frame part 46 with the wheel ahead of it. To permit adjustment to accommodate various types of bicycles, the frame attachment members 36 and 40 may be telescopically adjustable as shown at 36' and 40' to ensure sufficient clearance between the rear tire and the part 46 of the frame of the following bicycle even when the rear wheel is just passing over a rise or hill. In order to maintain the stud in vertical position if this is desired to facilitate engaging one cycle section with the other, a pair of helical springs 62 may be arranged in complementary recesses in the part 60 and in the upper clamp member 51, as shown in Figure 3, which recesses preferably are curved about the axis of the trunnions for obvious reasons.

With the construction of parts just described, it is clear that the functions of the objects of the invention can be readily carried out. The cycle sections which are parts of commercial bicycles are readily separable and in the event of injury to one it can be separated from the multi-cycle rapidly and without the use of tools. Any number of following sections can be appended to a lead cycle. The reduction in the total number of wheels, the lightness of the frame members, and the in-line positioning of the riders contribute to high speeds. The individual sections are compact and readily stored or handled and can be easily trundled over ground too rough for riding. Any following section can readily be converted into a full bicycle by the addition of a front wheel when desired. The only parts not conventional on any section are the frame extensions, which however provide convenient luggage platforms and may be used at any time for that purpose independently of the multi-cycle pivots which they carry.

Having thus described the invention, what is claimed as new and desired to be secured by Letters Patent is:

1. In a multi-cycle, in combination, a lead bicycle having a steerable wheel, a following section having only a single wheel, and means detachably connecting said sections, said means including a member mounted on the lead bicycle for rocking movement about an axis above the ground a distance greater than the diameter of said wheel and in only the plane of the frame thereof and a member rigid with the frame of the following section and revoluble about an axis passing through said first member.

2. In a multi-cycle, in combination, a lead cycle having a frame, a driving wheel and a steerable wheel, a following cycle having a frame and a driving wheel, and means connecting the forward end of the frame of the following cycle to the rear end of the frame of the lead cycle, said means comprising a free-ended, rod-like member mounted by one end on the frame of one of the cycles for limited rocking movement only about an axis transverse to the plane of said frame, and a closed end socket part rigid with the other frame which engages over said member for free rotation thereon about a substantially vertical axis lying in the plane of the frame of the lead cycle, said member and part supporting the frame of the following cycle frame from the frame of the lead cycle.

3. The combination set forth in claim 2 in which said member is normally held by yielding elements in a predetermined position.

4. In a multi-cycle, in combination, a bicycle having a frame, a steerable wheel and a propulsion wheel supporting said frame, a following cycle section having a frame, a single wheel supporting said section, a portion of the frame of the following section extending over the rear wheel of the bicycle, a removable frame extension clamped to the bicycle and extending over the rear wheel thereof, a pivot stud carried by said extension and cooperating removably with said following section frame portion to secure the bicycle and following section in tandem, means to prevent relative rotational movement about a horizontal axis of the bicycle and following section, and a transverse pivot for said stud whereby the vehicles can pass over irregular ground and maintain all wheels in contact therewith.

5. An attachment for converting bicycles into a multi-cycle comprising a pivot stud adapted for substantially vertical mounting above the rear wheel of a bicycle, means jointly supporting said stud comprising a portion adapted for clamping to the bicycle near the seat post, and a portion adapted for clamping to the bicycle near the rear axle.

6. An attachment as defined in claim 5 in which at least one of said portions is adjustable in length to accommodate variations in bicycle frame.

7. An attachment as defined in claim 5 in which the first mentioned portion provides a substantially horizontal platform adapted for use as a luggage carrier.

GEORGE B. DU BOIS.